United States Patent
Wang et al.

(10) Patent No.: US 7,683,979 B2
(45) Date of Patent: Mar. 23, 2010

(54) MULTI-DOMAIN VERTICAL ALIGNMENT (MVA) PIXEL STRUCTURE

(75) Inventors: Hsien-Chun Wang, Taoyuan County (TW); Ting-Chang Hsu, Taoyuan County (TW)

(73) Assignee: Chunghwa Picture Tubes, Ltd, Taoyuan (TW)

( * ) Notice: Subject to any disclaimer, the term of this patent is extended or adjusted under 35 U.S.C. 154(b) by 28 days.

(21) Appl. No.: 12/204,811

(22) Filed: Sep. 5, 2008

(65) Prior Publication Data

US 2009/0231505 A1   Sep. 17, 2009

(30) Foreign Application Priority Data

Mar. 12, 2008  (TW) .............................. 97108693 A

(51) Int. Cl.
*G02F 1/136* (2006.01)
(52) U.S. Cl. .............................. 349/46; 349/41; 349/42; 349/43; 349/47; 349/48
(58) Field of Classification Search .................... 349/19, 349/33, 41–43, 46–48
See application file for complete search history.

(56) References Cited

U.S. PATENT DOCUMENTS

| 7,583,346 B2 * | 9/2009 | Hsieh et al. .................. 349/129 |
| 7,588,975 B2 * | 9/2009 | Lai ............................. 438/159 |
| 2004/0001167 A1 | 1/2004 | Takeuchi et al. |
| 2004/0178409 A1 | 9/2004 | Hong et al. |
| 2005/0030439 A1 | 2/2005 | Lyu |
| 2006/0215066 A1 | 9/2006 | Ueda et al. |

* cited by examiner

Primary Examiner—Jennifer Doan
(74) Attorney, Agent, or Firm—Jianq Chyun IP Office

(57) ABSTRACT

Each Multi-domain Vertical Alignment (MVA) pixel structures on a display panel array includes at least two sub-pixels. By adjusting the channel W/L ratios of the transistors in the sub-pixels, the sub-pixels may have different display voltages so as to improve the display quality in a slant vision. A transistor is disposed between one of the sub-pixels and a common line (Vcs) as the dispersion path for remaining electric charges to improve the condition of burn-in.

12 Claims, 4 Drawing Sheets

MULTI-DOMAIN VERTICAL ALIGNMENT (MVA) PIXEL STRUCTURE

CROSS-REFERENCE TO RELATED APPLICATION

This application claims the priority benefit of Taiwan application serial no. 97108693, filed on Mar. 12, 2008. The entirety of the above-mentioned patent application is hereby incorporated by reference herein and made a part of specification.

BACKGROUND OF THE INVENTION

1. Field of the Invention

The present invention relates to a pixel structure and particularly relates to a multi-domain vertical alignment (MVA) pixel structure.

2. Description of Related Art

A liquid crystal display (LCD), with its good spatial utilization, low power consumption, no radiation, and other distinguished features, has become the mainstream of the market. For better display quality of the LCD, various LCDs with wide view angles have been developed on the market. Some common examples are an in-plane switching (IPS) LCD, a fringe field switching LCD, and an MVA LCD.

The MVA LCD provides an effect of a wide view angle. However, the light transmittance of the MVA LCD varies according to the view angles. That is, the brightness level of the MVA LCD differs in a normal vision and in a slant vision, thereby resulting in problems of color shift and low color saturation in the display image.

The problem of color shift often occurs in a slant vision in that Gamma curves of a normal vision angle and a slant vision angle are different (as illustrated in FIG. 1). FIG. 1 illustrates Gamma curves of normal vision angles and slant vision angles of an MVA LCD, wherein the horizontal axis represents gray level values and the vertical axis represents transmittance rates (T %).

In the current technology for solving the problem of color shift, sub-pixels in the pixels are coupled to different voltages so as to change tilt angles of the liquid crystals and to improve color shift. Two conventional technologies are briefly described hereunder.

Refer to US Patent No. US 2004/0001167 for the first conventional technology. FIG. 2 shows an equivalent circuit of a pixel in this conventional technology. As shown in FIG. 2, the conventional pixel comprises a transistor M21, a storage capacitor Cs21, and a liquid crystal capacitor Clc21, all three of which form a sub-pixel. The conventional pixel also comprises a transistor M22, a storage capacitor Cs22, and a liquid crystal capacitor Clc22, all three of which form another sub-pixel. Furthermore, there exist a parasitic capacitor Cgd21 and a parasitic capacitor Cgd22 in the pixel.

In the first conventional technology, the display voltage difference between the two sub-pixels is described by Formula 1:

$$\Delta Vlc = Vcsp * \frac{Ccs}{Cpix} \quad (1)$$

Cpix refers to the sum of all the capacitance values of the pixel, Ccs refers to the capacitance value of the storage capacitor Cs21 or Cs22, and Vcsp refers to the alternating current (AC) voltage applied to the storage capacitor.

In the conventional technology, the display voltage difference is changed by adjusting a capacitance value Ccs and a voltage Vcsp of the storage capacitor. In other words, each of the two sub-pixels has a different pixel display voltage to improve the Gamma curves in a slant vision. As a result, the conventional technology provides a significant improvement. However, the demand for the RC delay of the Cs signals (i.e. the voltage applied to the storage capacitor, its value being Vcom±(+0.5)*Vcsp or Vcom±(−0.5)*Vcsp) is high. Extra space is required to dispose the conductive line of the Cs in the design of the peripheral area of the panel, which increases the panel area and affects the layout evaluation.

Refer to US Patent No. US 2005/0030439 for the second conventional technology. In this conventional technology, the two sub-pixels have different pixel display voltages to correct the problem of color shift in a slant vision. FIG. 3 shows an equivalent circuit of a pixel in the second conventional technology. As shown in FIG. 3, the conventional pixel comprises a transistor M31, storage capacitors Cs31 and Cs32, a coupled capacitor Ccp3, and liquid crystal capacitors Clc31 and Clc32.

The ratio of the display voltages of the two sub-pixels are shown in Formula 2:

$$\frac{V32}{V31} = \frac{Ccp3}{Clc32 + Ccp3 + Cs32} \quad (2)$$

However, the display voltage difference ΔVp of the two sub-pixels is inconsistent because of the coupled capacitor Ccp3. As a result, the common voltage Vcom of the two sub-pixels is also inconsistent. Accordingly, this results in an accumulation of electric charges and the condition of burn-in during a long period of display due to the lack of a dispersion path for the remaining electric charges.

Hence, a new pixel structure is provided herein to improve the problem of color shift in a slant vision and reduce the condition of burn-in without the need for special Cs signals.

SUMMARY OF THE INVENTION

An embodiment of the present invention provides an MVA pixel structure to effectively improve the condition of color shift.

An embodiment of the present invention provides an MVA pixel structure to effectively improve the condition of burn-in. In the present embodiment, to prevent the condition of burn-in, an extra transistor is disposed between a sub-pixel and a common line (Vcs) to form a dispersion path for the remaining electric charges. In addition, the amount of the parasitic capacitors (Cgd and Cgs) of the respective transistors may also be adjusted to make the display voltage difference ΔVp between the respective sub-pixels as close to zero as possible. As such, the Vcom levels between the two sub-pixels would be closer and the accumulation of the electric charges would be very mild. The condition of burn-in is therefore improved.

The present embodiment provides an MVA pixel structure comprising a substrate, a plurality of scan lines disposed on the substrate, a plurality of data lines disposed on the substrate, a plurality of common lines disposed on the substrate, and a plurality of pixel units disposed on the substrate. Each of the pixel units includes a first pixel electrode, a second pixel electrode, a third pixel electrode, and an active device with multiple drains. The active device with multiple drains comprises at least a gate, a patterned source, a first drain, a second drain and a third drain. The gate is electrically connected to the corresponding scan line. The patterned source is electrically connected to the corresponding data line. The first drain is electrically connected to the first pixel electrode. The second drain is electrically connected to the second pixel electrode. The third drain is electrically connected to the third pixel electrode which is further electrically connected to the corresponding common line. The gate, the patterned source, and the first drain form a first active device. The gate, the patterned source, and the second drain form a second active device. The gate, the patterned source, and the third drain form a third active device. A display voltage difference between the first pixel electrode and the second pixel electrode relates to the device size features of the second active device and the third active device. The condition of color shift is therefore improved. The third active device may act as the dispersion path for the remaining electric charges.

Another embodiment of the present invention provides an MVA pixel structure, wherein each pixel comprises two sub-pixels. One of the sub-pixels includes a first active device. The first active device comprises a control terminal coupled to a scan line, a first terminal coupled to a data line, and a second terminal. The sub-pixel also comprises a first liquid crystal capacitor coupled between the second terminal of the first active device and a common electrode as well as a first storage capacitor coupled between the second terminal of the first active device and a common line. The other sub-pixel comprises a second active device. The second active device comprises a control terminal coupled to the scan line, a first terminal coupled to the data line, and a second terminal. The sub-pixel also includes a third active device. The third active device comprises a control terminal coupled to the scan line, a first terminal coupled to the second terminal of the second active device, and a second terminal coupled to the common line. The sub-pixel further comprises a second liquid crystal capacitor coupled between the second terminal of the second active device and the common electrode as well as a second storage capacitor coupled between the second terminal of the second active device and the common line. A display voltage difference between the first sub-pixel and the second sub-pixel relates to the device size features of the second active device and the third active device. The third active device may be the dispersion path for the remaining electric charges.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the present embodiment, to prevent the condition of burn-in, an extra transistor is disposed between a sub-pixel and a common line to form a path to dissipate remaining electric charges. In addition, the amount of the parasitic capacitors (Cgd and Cgs) of the respective transistors may also be adjusted to make the display voltage difference ΔVp between the respective sub-pixels as close to zero as possible. As such, the Vcom levels between the two sub-pixels would be closer and the accumulation of the electric charges would be very mild. Thus, the condition of burn-in is improved. In addition, by adjusting a W/L ratio of a TFT channel and applying the concept of using resistors to disperse voltages, the pixel is divided into two or more sub-pixels, each of which has a different display voltage level to improve the condition of color shift in a slant vision.

Figure 1:
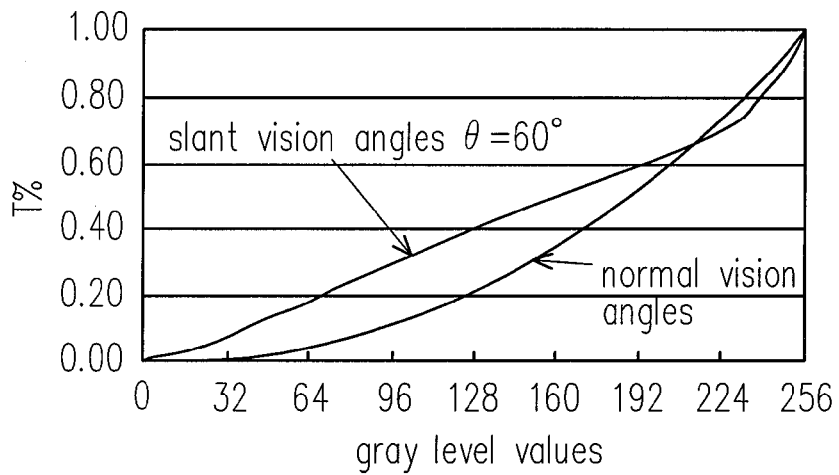
FIG. 1 illustrates the Gamma curves of slant vision angles and normal vision angles of an MVA LCD.
Figure 2:
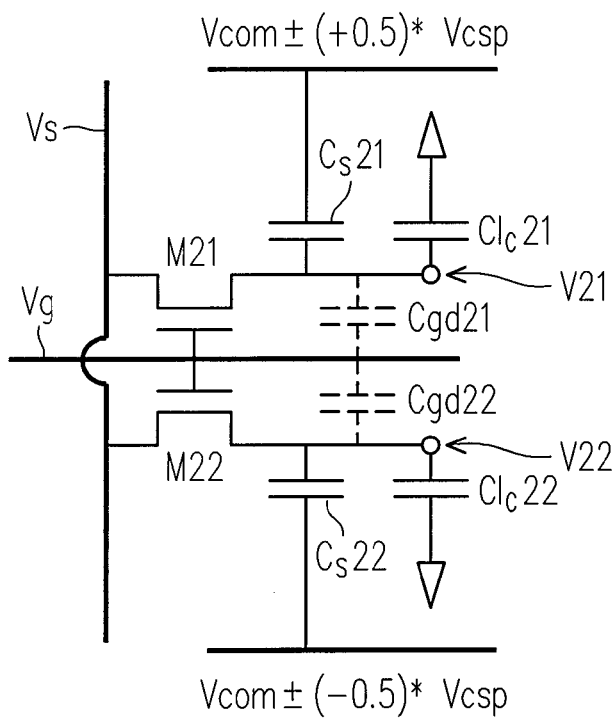
FIG. 2 illustrates an equivalent circuit of a pixel in the first conventional technology.
Figure 3:
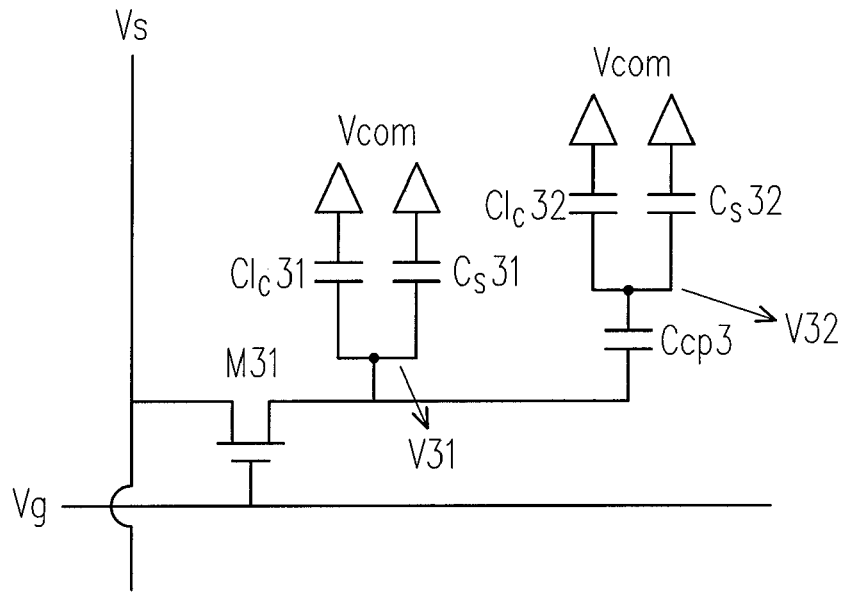
FIG. 3 illustrates an equivalent circuit of a pixel in the second conventional technology.
Figure 4:
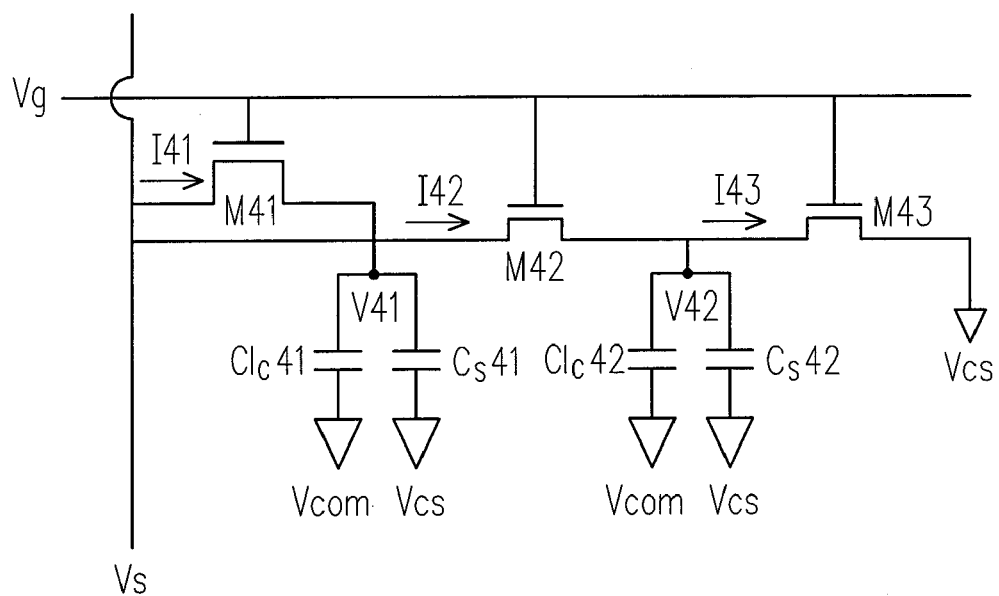
FIG. 4 is an equivalent circuit diagram of an MVA pixel structure according to an embodiment of the present invention.

FIG. 4 is an equivalent circuit diagram of an MVA pixel structure according to an embodiment of the present invention. As shown in FIG. 4, the pixel comprises two sub-pixels. One of the sub-pixels comprises a transistor M41, a liquid crystal capacitor Clc41, and a storage capacitor Cs41. The other sub-pixel comprises transistors M42 and M43, a liquid crystal capacitor Clc42, and a storage capacitor Cs42.

The transistor M41 comprises a gate coupled to a scan line Vg, a source coupled to a data line Vs, and a drain.

One terminal of the liquid crystal capacitor Clc41 is coupled to the drain of the transistor M41, while the other terminal is coupled to a common voltage Vcom, also referred to as a common electrode.

One terminal of the storage capacitor Cs41 is coupled to the drain of the transistor M41, while the other terminal is coupled to a common line Vcs.

The transistor M42 comprises a gate coupled to the scan line Vg, a source coupled to the data line Vs, and a drain.

One terminal of the liquid crystal capacitor Clc42 is coupled to the drain of the transistor M42, while the other terminal is coupled to the common voltage Vcom.

One terminal of the storage capacitor Cs42 is coupled to the drain of the transistor M42, while the other terminal is coupled to the common line Vcs.

The transistor M43 comprises a gate coupled to the scan line Vg, a source coupled to the drain of the transistor M42, and a drain coupled to the common line Vcs. The transistor M43 may be used as a dispersion path for the remaining electric charges.

In a common TFT voltage-current Formula 3, $$I = \frac{W}{L}\mu Ci\left[(Vg - Vs) - Vth - \left(\frac{Vd - Vs}{2}\right)\right](Vd - Vs) \qquad (3)$$

I refers to the current that flows through the transistor, (W/L) refers to the ration of the channel width to the channel length of the transistor, μ refers to the electron mobility, Ci refers to the capacitance value per unit area of a gate oxide layer, Vg refers to a gate voltage, Vs refers to a source voltage, Vth refers to a threshold voltage, and Vd refers to a drain voltage.

Formula 3 is re-arranged as follows:

$$R = \frac{Vd - Vs}{I} = \frac{L}{W}\frac{1}{\mu Ci\left[(Vg - Vs) - Vth - \frac{Vd - Vs}{2}\right]} \qquad (4)$$

R refers to the resistance of the transistor under a direct current.

For the transistor M42 (I42 is the current that flows through the transistor M42):

$$R_{42} = \frac{Vs - V42}{I42} \quad (5)$$

$$= \frac{L42}{W42} \frac{1}{\mu Ci\left[(Vg - V42) - Vth - \frac{Vs - V42}{2}\right]}$$

$$= \frac{L42}{W42} \frac{1}{\mu Ci\left[\left(Vg - Vth - \frac{1}{2}V42\right) - \frac{1}{2}Vs\right]}$$

For the transistor M43 (I43 is the current that flows through the transistor M43):

$$R_{43} = \frac{V42 - Vcs}{I43} \quad (6)$$

$$= \frac{L43}{W43} \frac{1}{\mu Ci\left[(Vg - Vcs) - Vth - \frac{V42 - Vcs}{2}\right]}$$

$$= \frac{L43}{W43} \frac{1}{\mu Ci\left[\left(Vg - Vth - \frac{1}{2}V42\right) - \frac{1}{2}Vcs\right]}$$

$$= \frac{L43}{W43} \frac{1}{\mu Ci\left[\left(Vg - Vth - \frac{1}{2}V42\right) - \frac{1}{2}Vs + \frac{1}{2}(Vs - Vcs)\right]}$$

According to Formula 5 and Formula 6, a display voltage V42 of the second sub-pixel may be represented as:

$$V42 = \frac{R43}{R42 + R43}(Vs - Vcs) \quad (7)$$

$$= \frac{\left[\frac{L43}{W43} \frac{1}{\mu Ci\left[\left(Vg - Vth - \frac{1}{2}V42\right) - \frac{1}{2}Vs + \frac{1}{2}(Vs - Vcs)\right]}\right]}{\left[\frac{L42}{W42} \frac{1}{\mu Ci\left[\left(Vg - Vth - \frac{1}{2}V42\right) - \frac{1}{2}Vs\right]}\right] + \left[\frac{L43}{W43} \frac{1}{\mu Ci\left[\left(Vg - Vth - \frac{1}{2}V42\right) - \frac{1}{2}Vs + \frac{1}{2}(Vs - Vcs)\right]}\right]} (Vs - Vcs)$$

Make $$A(Vs) = \left[Vg - Vth - \frac{1}{2}V42\right] - \frac{1}{2}Vs.$$

Formula 7 may be re-written as:

$$V42 = \frac{R43}{R42 + R43}(Vs - Vcs) \quad (8)$$

$$= \frac{\left[\frac{L43}{W43} \frac{1}{\mu CiA(Vs) + \frac{1}{2}\mu Ci(Vs - Vcs)}\right]}{\frac{L42}{W42} \frac{1}{\mu CiA(Vs)} + \left[\frac{L43}{W43} \frac{1}{\mu CiA(Vs) + \frac{1}{2}\mu Ci(Vs - Vcs)}\right]} (Vs - Vcs)$$

$$= \frac{\frac{L43}{W43}}{\frac{L42}{W42} \frac{\mu CiA(Vs) + \frac{1}{2}\mu Ci(Vs - Vcs)}{\mu CiA(Vs)} + \frac{L43}{W43}} (Vs - Vcs)$$

$$= \frac{\frac{L43}{W43}}{\frac{L42}{W42}\left(1 + \frac{1}{2}\frac{(Vs - Vcs)}{A(Vs)}\right) + \frac{L43}{W43}} (Vs - Vcs)$$

Suppose Vg=25V, Vth=2V, V42=10V, Vs=10V, Vcs=5V, and $$\frac{\frac{L2}{W1}}{\frac{L3}{W3}} = \frac{1}{4}$$

in Formula 8. We get:

$$\frac{L42}{W42}\left(1 + \frac{1}{2}\frac{(Vs - Vcs)}{A(Vs)}\right) + \frac{L43}{W43} = \frac{L42}{W42} * \left(1 + \frac{1}{2}\frac{5}{13}\right) + 4 * \frac{L42}{W42} = \quad (9)$$

$$5.2 * \frac{L42}{W42} \approx 5 * \frac{L42}{W42} = \frac{L42}{W42} + \frac{L43}{W43}$$

Therefore, $$V42 = \frac{R43}{R42 + R43}(Vs - Vcs) \approx \frac{\frac{L43}{W43}}{\frac{L42}{W42} + \frac{L43}{W43}}(Vs - Vcs) \quad (10)$$

The display voltage of the first sub-pixel V41=Vs−Vcs. Hence, the ratio of the display voltage V42 and V41 is:

$$\frac{V42}{V41} = \frac{\frac{L43}{W43}}{\frac{L42}{W42} + \frac{L43}{W43}} \quad (11)$$

Accordingly, we may adjust the voltage differences of the respective sub-pixels by modifying the channel W/L ratios of the transistors M42 and M43.

Figure 5A:
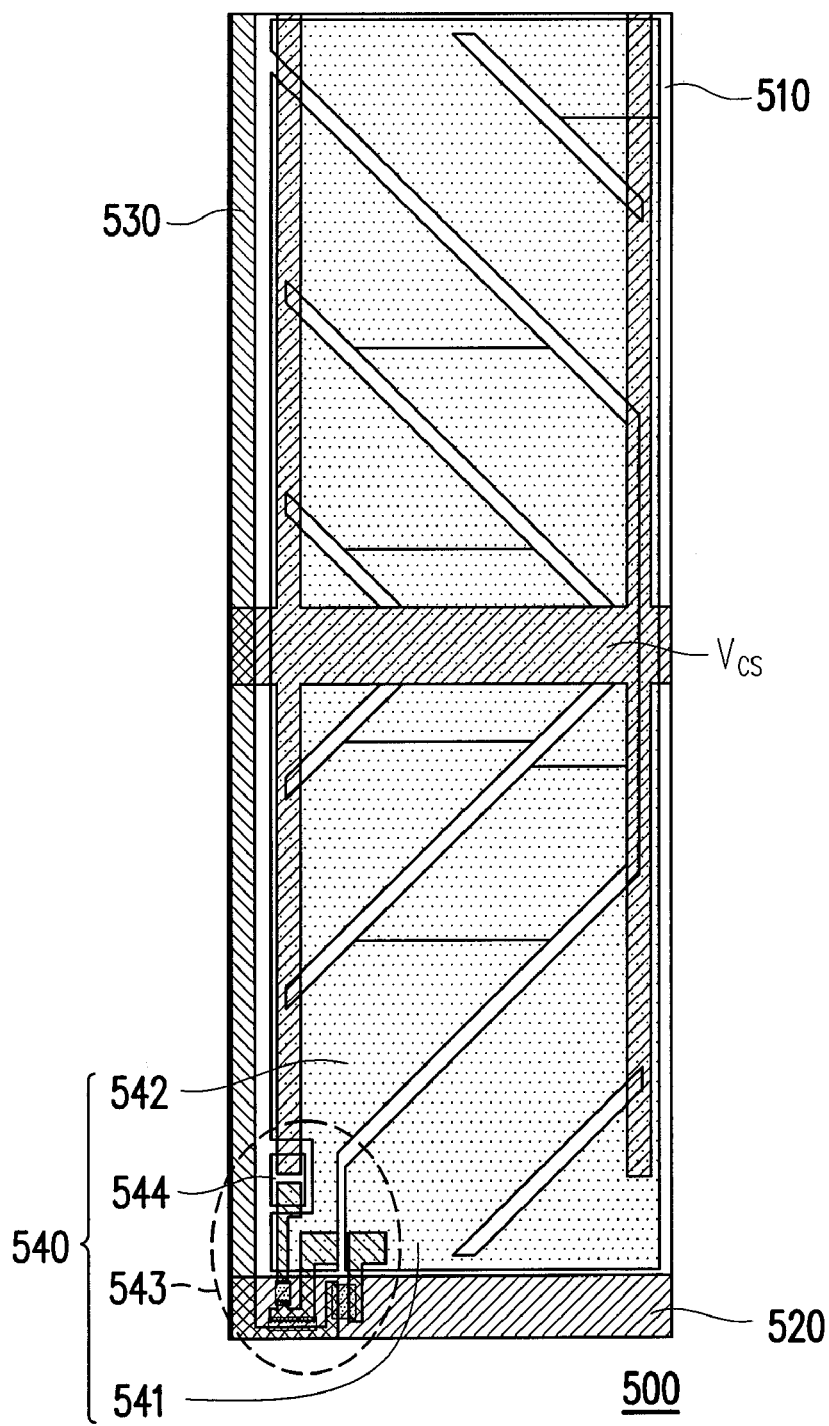
FIG. 5a and FIG. 5b are top views of an MVA pixel structure of an embodiment of the present invention.
Figure 5B:
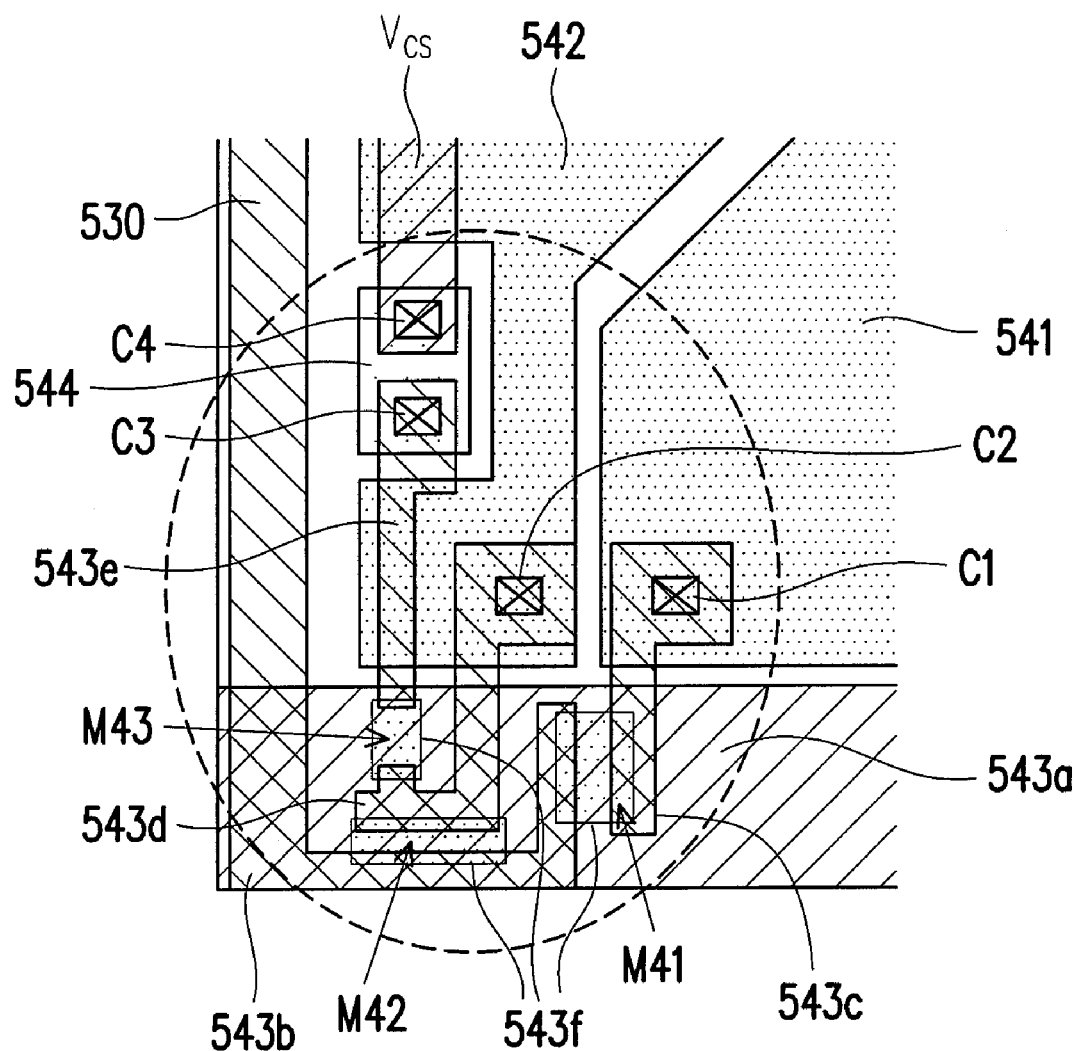

FIG. 5a and FIG. 5b are top views of an MVA pixel structure of the present embodiment. FIG. 5b is an enlarged view showing part of FIG. 5a. Please refer to both FIG. 5a and FIG. 5b simultaneously. The MVA pixel structure 500 comprises a substrate 510, a plurality of scan lines 520, a plurality of data lines 530, and a plurality of pixel units 540. For the purpose of simplification, only one scan line 520, one data line 530 and one pixel unit 540 are shown in FIG. 5a and FIG. 5b. The scan line 520 and the data line 530 are disposed on the substrate 510. The pixel unit 540 mainly comprises a first pixel electrode 541, a second pixel electrode 542, a third pixel electrode 544, and an active device 543 with three drains. In addition, the MVA pixel structure 500 may further comprise a common line Vcs disposed on the substrate 510. In practice, the common line Vcs is electrically connected to a reference voltage source.

From FIG. 5a and FIG. 5b, the first pixel electrode 541 and the second pixel electrode 542 have a plurality of slits so as to divide a plurality of domains among the liquid crystals corresponding to the first pixel electrode 541 and the second pixel electrode 542. It will certainly be apparent to those skilled in the art that the division of domains may also be achieved by a plurality of alignment bumps on the first pixel electrode 541 and the second pixel electrode 542, which is not limited herein.

The configuration position of the active device 543 with three drains may be properly adjusted according to the area ratio between the first pixel electrode 541 and the second pixel electrode 542, depending on actual needs.

The active device 543 with three drains comprises a gate 543a, a patterned source 543b, a first drain 543c, a second drain 543d, a third drain 543e, and a semiconductor layer 543f. The gate 543a is disposed on the substrate 510. In general, the gate 543a is covered by a gate insulating layer (not shown). In addition, the semiconductor layer 543f is disposed on the gate insulating layer above the gate 543a. The patterned source 543b, the first drain 543c, the second drain 543d, and the third drain 543e are disposed on the semiconductor layer 543f.

In practice, the gate 543a is electrically connected to the scan line 520. The patterned source 543b is electrically connected to the data line 530. Alternatively, the gate 543a may be a part of the scan line 520, while the patterned source 543b may be an outward extension of the data line 530. The gate 543a, the patterned source 543b, and the first drain 543c may form the first active device M41. The gate 543a, the patterned source 543b, and the second drain 543d may form the second active device M42. The gate 543a, the patterned source 543b, and the third drain 543e may form the third active device M43.

From FIG. 5a and FIG. 5b, the first drain 543c of the first active device M41 may be electrically connected to the first pixel electrode 541 through a contact opening C1. The second drain 543d of the second active device M42 may be electrically connected to the second pixel electrode 542 through a contact opening C2. The third drain 543e of the third active device M43 may be electrically connected to the third pixel electrode 544 through a contact opening C3. The third pixel electrode 544 may be electrically connected to the common line Vcs through a contact opening C4. In other words, the third drain 543e of the third active device M43 may be jump wired to the common line Vcs through the contact openings C3 and C4.

The second drain 543d may be electrically connected to the second pixel electrode 542 through the contact opening C2. Alternatively, the second drain 543d of the second active device M42 may be extended between the substrate 510 and the second pixel electrode 542 and coupled to the capacitor of the second pixel electrode 542, which is not limited herein.

In the present embodiment, the first pixel electrode 541 and the second pixel electrode 542 may be charged through the first active device M41 and the second active device M42, respectively and may have different display voltages (as the voltages V41 and V42 in FIG. 4). Accordingly, the liquid crystals corresponding to the first pixel electrode 541 and the second pixel electrode 542 are respectively driven by different voltages so as to have tilting conditions of various degrees. In other words, domains of more directions may be divided among the liquid crystals.

For example, as illustrated in FIG. 5a and FIG. 5b, the first pixel electrode 541 may divide the liquid crystals into four domains. The second pixel electrode 542 may also divide the liquid crystals into four domains. The tilting conditions of the liquid crystals in the four domains divided by the first pixel electrode 541 would differ from the tilting conditions of the liquid crystals in the four domains divided by the second pixel electrode 542 because the first pixel electrode 541 and the second pixel electrode 542 have different voltages. Alternatively speaking, in the present embodiment, the MVA pixel structure 500 may be divided into at least eight domains. As such, the MVA pixel structure 500 may effectively improve the condition of color shift and increase picture quality.

The areas of the first pixel electrode 541, the second pixel electrode 542, and the third pixel electrode 544 may be properly adjusted depending on actual requirement, which are not limited herein. FIG. 5a and FIG. 5b are provided as examples for the purpose of illustration. The area ratios of the first pixel electrode 541, the second pixel electrode 542, and the third pixel electrode 544 are not limited herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-domain vertical alignment (MVA) pixel structure, comprising:
    a substrate;
    a plurality of scan lines, disposed on the substrate;
    a plurality of data lines, disposed on the substrate;
    a plurality of common lines, disposed on the substrate; and
    a plurality of pixel units, disposed on the substrate, each of the pixel units comprising:
        a first pixel electrode;
        a second pixel electrode;
        a third pixel electrode; and
        an active device with multiple drains, comprising at least a gate, a patterned source, a first drain, a second drain, and a third drain;
        wherein the gate is electrically connected to the corresponding scan line, the patterned source is electrically connected to the corresponding data line, the first drain is electrically connected to the first pixel electrode, the second drain is electrically connected to the second pixel electrode, the third drain is electrically connected to the third pixel electrode, the third pixel electrode is electrically connected to the corresponding common line, and
        the gate, the patterned source, and the first drain form the first active device, the gate, the patterned source, and the second drain form the second active device, the gate, the patterned source, and the third drain form the third active device, and a display voltage difference between the first pixel electrode and the second pixel electrode relates to device size features of the second active device and the third active device.

2. The MVA pixel structure according to claim 1, wherein the second drain is capacitively coupled to the second pixel electrode.

3. The MVA pixel structure according to claim 1, wherein the patterned source, the first drain, the second drain, and third drain are disposed above the gate.

4. The MVA pixel structure according to claim 1, wherein the first pixel electrode comprises a plurality of slits.

5. The MVA pixel structure according to claim 1, wherein the second pixel electrode comprises a plurality of slits.

6. The MVA pixel structure according to claim 1, wherein the first active device comprises an MOS transistor.

7. The MVA pixel structure according to claim 1, wherein the second active device comprises an MOS transistor.

8. The MVA pixel structure according to claim 1, wherein the third active device comprises an MOS transistor.

9. A multi-domain vertical alignment (MVA) pixel structure, comprising:
   a first sub-pixel, comprising:
      a first active device, comprising a control terminal coupled to a scan line, a first terminal coupled to a data line, and a second terminal;
      a first liquid crystal capacitor, coupled between the second terminal of the first active device and a common electrode; and
      a first storage capacitor, coupled between the second terminal of the first active device and a common line; and
   a second sub-pixel, comprising:
      a second active device, comprising a control terminal coupled to the scan line, a first terminal coupled to the data line, and a second terminal;
      a third active device, comprising a control terminal coupled to the scan line, a first terminal coupled to the second terminal of the second active device, and a second terminal coupled to the common line;
      a second liquid crystal capacitor, coupled between the second terminal of the second active device and the common electrode; and
      a second storage capacitor, coupled between the second terminal of the second active device and the common line,
   wherein a display voltage difference between the first sub-pixel and the second sub-pixel relates to device size features of the second active device and the third active device.

10. The MVA pixel structure according to claim 9, wherein the first active device comprises an MOS transistor.

11. The MVA pixel structure according to claim 9, wherein the second active device comprises an MOS transistor.

12. The MVA pixel structure according to claim 9, wherein the third active device comprises an MOS transistor.

* * * * *